United States Patent
Kotov et al.

(10) Patent No.: US 6,731,673 B1
(45) Date of Patent: May 4, 2004

(54) SYNCHRONIZATION CHANNEL WITH CYCLIC HIERARCHICAL SEQUENCES AND METHOD FOR CELL SITE SEARCH WITH LOW DETECTOR COMPLEXITY

(75) Inventors: Anatoli V. Kotov, Ottawa (CA); Farideh Khaleghi, Ottawa (CA); Norman Secord, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/504,548

(22) Filed: Feb. 15, 2000

Related U.S. Application Data (60) Provisional application No. 60/120,947, filed on Feb. 19, 1999.

(51) Int. Cl.[7] .......................... H04B 1/69; H04B 1/707; H04B 1/713
(52) U.S. Cl. ...................................... 375/145; 375/365
(58) Field of Search ................................ 375/365, 366, 375/367, 145; 714/775, 789, 798; 380/268; 370/509

(56) References Cited

U.S. PATENT DOCUMENTS 5,544,180 A * 8/1996 Gupta ........................ 714/798

* cited by examiner

Primary Examiner—Stephen Chin
Assistant Examiner—Curtis Odom
(74) Attorney, Agent, or Firm—Mintz, Levin, Cohn, Ferris, Glovsky and Popeo, P.C.

(57) ABSTRACT

A CDMA system in which the base stations transmit a synchronization channel comprising a primary subchannel from which slot synchronization is determinate and a secondary subchannel containing a cyclic hierarchical code unique for each base station and for each slot in a frame. The cyclic code is derived from a first code unique to a base station and a different cyclic shift of a second code also unique to the base station in each slot of a frame. Mobile stations quickly and with low-complexity detectors determine slot synchronization from the primary subchannel and then determine base station identification and frame synchronization by correlating samples of signal received on the secondary subchannel with a set of first codes and cyclic shifts of corresponding second codes.

36 Claims, 3 Drawing Sheets

SYNCHRONIZATION CHANNEL WITH CYCLIC HIERARCHICAL SEQUENCES AND METHOD FOR CELL SITE SEARCH WITH LOW DETECTOR COMPLEXITY

CROSS REFERENCE TO CO-PENDING APPLICATIONS

This is a utility patent application based on Provisional Application Serial No. 60/120,947 filed Feb. 19, 1999 and claims priority from Provisional Application Serial No. 60/120,947.

FIELD OF THE INVENTION

This invention pertains generally to DS-CDMA cellular radio systems, and more particularly to a Synchronization Channel for asynchronous DS-CDMA base stations that facilitates cell search by a mobile station.

BACKGROUND OF THE INVENTION

In conventional DS-CDMA (direct sequence code-division multiple access) systems, the downlink channels for each cell site are constructed by spreading the data with a long code. (The term "long code" connotes that the spreading code is much longer than data symbol periods.) A reason for spreading in such manner is so that when correlating with a particular long code so as to detect a downlink signal from a particular cell, downlink signals from other cells appear as noise and can thus be discriminated against. A mobile station (MS) finds the strongest cell site and acquires that cell site's long code at the beginning of communication.

In synchronous cellular systems such as second generation IS-95, different time-shifted versions of a single code sequence are assigned to different cell cites, which enables cell search to be accomplished in a relatively short time. (The sequence is known, and only the time shift is to be determined for each cell site.) With this method, an external timing source is required to time-synchronize all cell sites to within a few microseconds. A commonly used external timing source is the Global Positioning System (GPS), with GPS receivers deployed at the cell sites.

However, some cell sites are unable to receive GPS signals, particularly those that are located indoors. In order to flexibly deploy the system in which mobile stations may transmit from outdoors to indoors, it might be advantageous to use asynchronous cell site operation because it does not require the external timing source. In asynchronous cell site operation, however, a different long code is assigned to each cell in order to distinguish one cell from another. Thus, several hundred long codes might be required throughout the system. In general, the cell search time in asynchronous systems is much longer than in synchronous systems since all the long codes used in the system are searched.

In third generation CDMA systems such as the UMTS system which operate in asynchronous mode, a special Synchronization Channel (SCH) is used in the downlink to speed up acquisition of a cell site. If the number of scrambling codes used in the system is L=MS, then these codes might be subdivided into M code groups each consisting of S scrambling codes. A three-step cell search algorithm has been chosen for the initial UMTS cell site acquisition using this concept of code groups: i) the mobile station detects a short spreading code common to all cell sites to acquire initial slot timing; ii) the mobile station then determines which of the M code groups the base station belongs to; and, iii) the final step is to search the S scrambling codes within the code group to acquire the actual long scrambling code of the base station.

The Synchronization Channel (SCH) carries a downlink signal used by the mobile stations for cell search in the first and second step of the initial cell site acquisition. The SCH consists of two sub-channels, the Primary SCH and Secondary SCH.

The Primary SCH carries an unmodulated code of length 256 chips, the Primary Synchronization Code (PSC), that is transmitted once every slot. The PSC is a sequence common to every cell in the system.

The Secondary SCH repeatedly transmits a sequence of unmodulated codes each of length 256 chips, the Secondary Synchronization Codes (SSC). These codes are transmitted in parallel with the codes transmitted on the Primary SCH. Conventionally, the SSC is structured to form a comma-free code word within the consecutive slots of one frame. The symbols in the code word are taken from a fixed set of codes of length 256. The order of symbols and which symbols to use are conventionally determined by a group-specific code word, for example a comma-free subcode of a Reed-Solomon code.

Each comma-free code word represents a scrambling code group identity, and since all code words are distinct under symbol-wise cyclic shifts, the frame timing can also be determined. In particular, M sequences are used to encode the M different code groups each containing S scrambling codes. The M sequences are constructed such that cyclic shifts of their constituent bits are unique, i.e., a non-zero cyclic shift of the bits of any one of the M sequences is not equivalent to some cyclic shift of any of the remaining M−1 sequences. Also, a non-zero cyclic shift of any one of the sequences is not equivalent to any other cyclic shift of itself. This property is used to uniquely determine both the long code group and the frame timing in the second step of cell acquisition.

In one realization of the UMTS Synchronization Channel, each of the SSCs is constructed by the position-wise addition modulo 2 of a Hadamard sequence (different for each SSC) and a hierarchical sequence used also on the Primary SCH. Cross-correlation values between the conventional PSC codes and SSC codes are not as low as desired. In some cases, the aperiodic cross correlations values between PSC and SSC can be up to 70% of the main peak of the auto-correlation function. There is thus a need for codes of limited length with better correlation (auto- and cross-correlation) properties. There is also a need for a code with a structure which can be correlated for detection with low complexity and in a short time interval to improve the acquisition performance of the secondary SCH.

SUMMARY OF THE INVENTION

In accordance with the teachings of the present invention, these and other advantages may be accomplished by the present systems and methods of providing an improved synchronization channel in CDMA systems. An embodiment of the present invention includes a method for a mobile station to identify a base station and to synchronize with frame timing of the identified base station, comprising: selecting in each base station a different first number from a first predetermined set of M numbers each of a first length N2; selecting in each base station a second number associated with the first number from a second predetermined set of M numbers each of a second length N1 where N1 is greater than or equal to the number of slots in a frame; transmitting from each base station a synchronization code of length N=N1×N2 digits determined in each slot by: generating each digit position of the synchronization code by: selecting a first digit from the first number according to a function of digit position in the synchronization code; selecting a second digit from the second number according to a function of digit position in the synchronization code; and adding the first and second digits in modulo arithmetic, and cyclically shifting the second number after each slot, and correlating in a mobile station samples of synchronization code received from a base station starting simultaneously with a start of a slot with combinations of: M values of the first number, and all cyclic shifts of each corresponding second number to produce M×N1 decision variables; and identifying a maximum decision variable, wherein a particular first number corresponding to the maximum decision variable identifies the first number selected at the base station, whereby the base station is identified; and wherein a particular cyclic shift corresponding to the maximum decision variable identifies the slot whose start corresponds to starting of a frame.

Another embodiment of the invention provides a propagated signal divided into frames, each frame comprising two or more slots one of which starts simultaneously with frame start and comprising a synchronization code determined by: selecting a first number from a first predetermined set of M numbers each of a first length N2; selecting a second number associated with the first number from a second predetermined set of M numbers each of a second length N1 where N1 is greater than or equal to the number of slots in a frame; determining a synchronization code of length N=N1×N2 digits in each slot by: generating each digit position of the synchronization code by: selecting a first digit from the first number according to a function of digit position in the synchronization code; selecting a second digit from the second number according to a function of digit position in the synchronization code; and adding the first and second digits in modulo arithmetic, and cyclically shifting the second number after each slot.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

In a UMTS communication system, a mobile station can identify slot timing of a base station according to a primary synchronization code which contains the same data for all base stations and which is transmitted at the start of each slot. The present invention facilitates actions in a mobile station for identifying the base station and synchronizing with frame timing of that base station according to a secondary synchronization code which contains different data for each base station, and which contains a different cyclic hierarchical sequence in each slot of a frame.

Cyclic hierarchical correlation sequences according to the present invention are constructed of two constituent correlation sequences related to each other in a hierarchical manner (i.e., an inner code and an outer code). The elements of the outer code are spread by the inner code.

Figure 1:
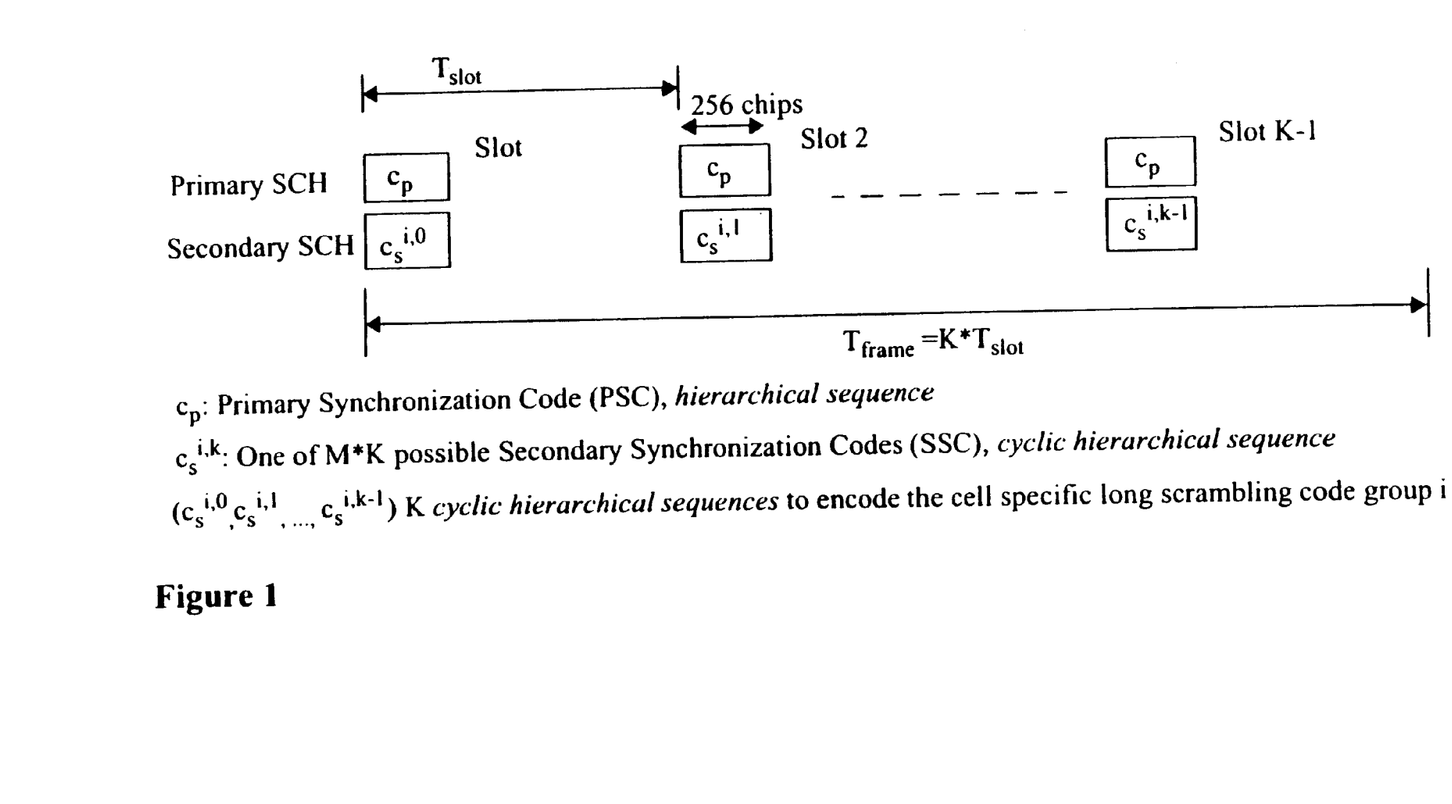
FIG. 1 depicts data organization on primary and secondary subchannels of a synchronization channel according to the present invention.

As shown in FIG. 1, in the UMTS system the data structure transmitted on the synchronization channel (SCH) consists of ten-millisecond frames. Each frame is divided into K slots where each slot is a multiple of 256 chips in length, although those skilled in the art will realize that the invention is applicable to systems using other numbers of slots per frame and other slot lengths. The synchronous channel includes two subchannels, the Primary and Secondary SCH.

The Primary SCH carries an unmodulated 256-chip code, the Primary Synchronization Code (PSC), that is transmitted once every slot. PSC is a hierarchical sequence common to every cell in the system. The Secondary SCH repeatedly transmits a sequence of length K of unmodulated 256-chip codes, known as the Secondary Synchronization Codes (SSC). Both the PSC and the SSC codes, 256 chips in length, are transmitted at the beginning of each slot.

A SCH in a UMTS system transmits codes $c_p$ as the PSC common to all base stations, as determined according to Eq. 1.

$$c_p(n) = X_2(n \bmod n_2) + X_1(n \text{ div } n_1) \bmod 2 \quad (1)$$

$$\text{for } n = 0, 1, \ldots, (n_1 * n_2) - 1$$

where: $n_1 * n_2 = n =$ length of code sequence here n=256

$n_1 = n_2 = 16$

In a current embodiment, the sequences $X_1$ and $X_2$ are chosen to be identical and to be:

$$X_1 = X_2 = <0,0,1,1,1,1,0,1,0,0,1,0,0,0,1,0>$$

(although those skilled in the art will appreciate that $X_1$ and $X_2$ could be different from one another, and could be of different lengths (i.e., $n_1$ and $n_2$ could have different values)) .Thus, the same code is transmitted on the PSC at the beginning of each slot.

In the SSC, however, according to an embodiment of the present invention, the code $c_s$ in each slot is a hierarchical code of length 256 chips, determined in a novel manner from an inner code and an outer code each of length 16. By using K≦16 different cyclic shifts (0, . . . ,K−1) of the bits of the outer code in each slot for a given inner code, K distinct codes are generated and transmitted for the K slots comprising a frame. A given base station repeatedly transmits a series of K codes while an adjoining base station would transmit a different series of K codes. M different sets of K hierarchical codes of length 256 can be produced, according to a predetermined set of M code groups to be used as the starting inner and outer sequences, all chosen to have good cross- and auto-correlation properties. Code $c_s$ is determined according to Eq. 2. Those skilled in the art will appreciate that in alternative embodiments other inner and outer code lengths may be employed, yielding other lengths of hierarchical codes.

$$c_s^{m,k}(n) = Y_{2,m}(n \bmod n_2) + Y_{1,m,k}(n \text{ div } n_1) \bmod 2 \quad (2)$$

$$\text{for } n = 0, 1, \ldots, (n_1 * n_2) - 1$$

where: $n_1 * n_2 = n$ = length of code sequence here $n = 256$ $n_1 = n_2 = 16$ $Y_{1,m}$ and $Y_{2,m}$ are selected from Table 1 according to m (a different value of m is used for each base station)

$Y_{1,m,k}$ are K cyclic shifts of $Y_{1,m}$ for k=0 to K−1 (as shown in Table 2 for m=1 and K=16)

For slot 0 (i.e., k=0), Eq. 2 reduces to Eq. 1. A difference from Eq. 1 is that the values of the binary sequences $Y_1$ and $Y_2$ are different for slots 1, . . . ,K−1 in a frame. $Y_1$ is cyclically shifted clockwise k−1 bit positions for each successive slot k, as shown in Table 2 for $Y_{1,1,k}$.

Another difference in Eq.2 over Eq. 1 is that the initial values of the sequences $Y_1$ and $Y_2$ may be unique for each of several adjoining base stations, the values being given in Table 1 according to a value m from 1 to M chosen for each particular base station. There are thus MK unique hierarchical codes that may be transmitted as $c_s$.

TABLE 1

| m | $Y_{1,m}$ and $Y_{2,m}$ | m | $Y_{1,m}$ and $Y_{2,m}$ |
|---|---|---|---|
| 1 | 0001 1101 1001 0100 | 17 | 0100 1010 0010 0010 |
| 2 | 0100 1000 1100 0001 | 18 | 0001 111 1011 10111 |
| 3 | 0010 1110 1010 0111 | 19 | 0111 0110 0001 1110 |
| 4 | 0111 1011 1111 0010 | 20 | 0010 0010 0100 1011 |
| 5 | 0001 0010 1001 1011 | 21 | 1110 0110 0101 0011 |
| 6 | 0100 0111 1100 1110 | 22 | 1011 0011 0000 0110 |
| 7 | 0010 0001 1010 1000 | 23 | 1101 0101 1001 1111 |
| 8 | 0111 0100 1111 1101 | 24 | 1000 0000 1100 1010 |
| 9 | 0010 1110 0101 1000 | 25 | 1000 1100 0111 1110 |
| 10 | 0111 1011 0000 1101 | 26 | 1101 1001 0010 1011 |
| 11 | 1011 1110 0001 0101 | 27 | 1000 0011 0111 0001 |
| 12 | 1110 1011 0100 0000 | 28 | 1101 0110 0010 0100 |
| 13 | 0111 0110 1110 0001 | 29 | 1011 0000 0100 0010 |
| 14 | 0010 0011 1011 0100 | 30 | 1110 0101 0001 0111 |
| 15 | 0111 1001 0001 0001 | 31 | 1000 1100 1000 0001 |
| 16 | 0010 1100 0100 0100 | 32 | 1101 1001 1101 0100 |

TABLE 2

| k | $Y_{1,1,k}$ |
|---|---|
| 0 | 0001110110010100 (from Table 1) |
| 1 | 0000111011001010 |
| 2 | 0000011101100101 |
| \| | \| |
| 15 | 0011101100101000 |

Thus, in the described embodiment, for the M code groups (one per base station) and the K slots (for the K shifts in each frame) MK unique cyclic hierarchical sequences with a length of 256 chips each are produced.

This resultant set of MK cyclic hierarchical sequences exhibits good correlation properties, rendering them suitable for use as synchronization codes. Many pairs (from the possible MK*(MK−1)/2 pairs) are fully orthogonal, some pairs have small cross-correlation properties, and only a very small percentage have cross-correlation values approaching 25% of the auto-correlation peak of the PSC. Consequently, the set of MK cyclic hierarchical sequences is a set of quasi-orthogonal codes. The cross-correlation of each sequence $c_s^{m,k}$ with $c_p$ transmitted on the PSC is small.

The operations in a mobile station to find and synchronize with a base station will now be described. The mobile station may be receiving signals from several base stations, and searches for the base station to which it has the lowest path loss. The mobile station then determines the downlink scrambling code and frame synchronization of that base station. This is carried out in three steps: i) slot synchronization; ii) frame synchronization and code group identification; and iii) scrambling code identification.

First, the slot synchronization step is described. The mobile station receives the modulated signal from the base station, including the synchronization code transmitted on the SCH and uses a matched filter or other suitable device for acquisition of the PSC which has the 256-chip hierarchical code cp appearing periodically every time slot and which is the same for all base stations.

The received radio signal is sampled by an A/D converter. A length-$n_2$ (here 16) correlation is then performed with sequence $X_2$ and the results (Ps) are stored in a primary buffer of length $n_1 * n_2$ (here 256). A length-$n_2$ (here 16) correlation P is performed with sequence $X_1$ of the primary buffer contents, using every sixteenth value thereof. This value P is the matched filter output to be used for slot accumulation and synchronization with the PSC.

It may be possible for sub-correlation sums Ps to be reused for the calculation of the matched filter correlation sums P for new input samples. To enhance reliability, the matched-filter output should be accumulated over a number of slots.

Figure 2:
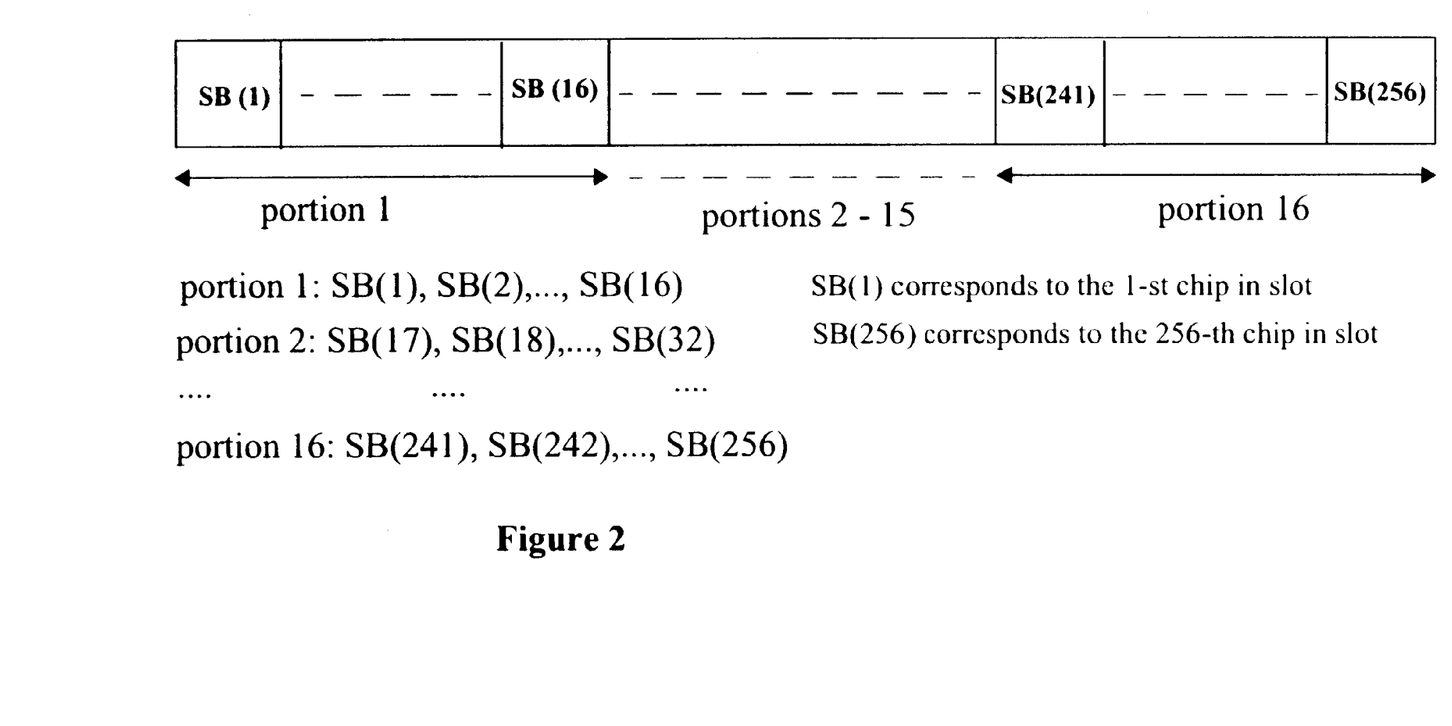
FIG. 2 shows the organization of a buffer for storing data received in a mobile station from the secondary synchronization channel.
Figure 3:
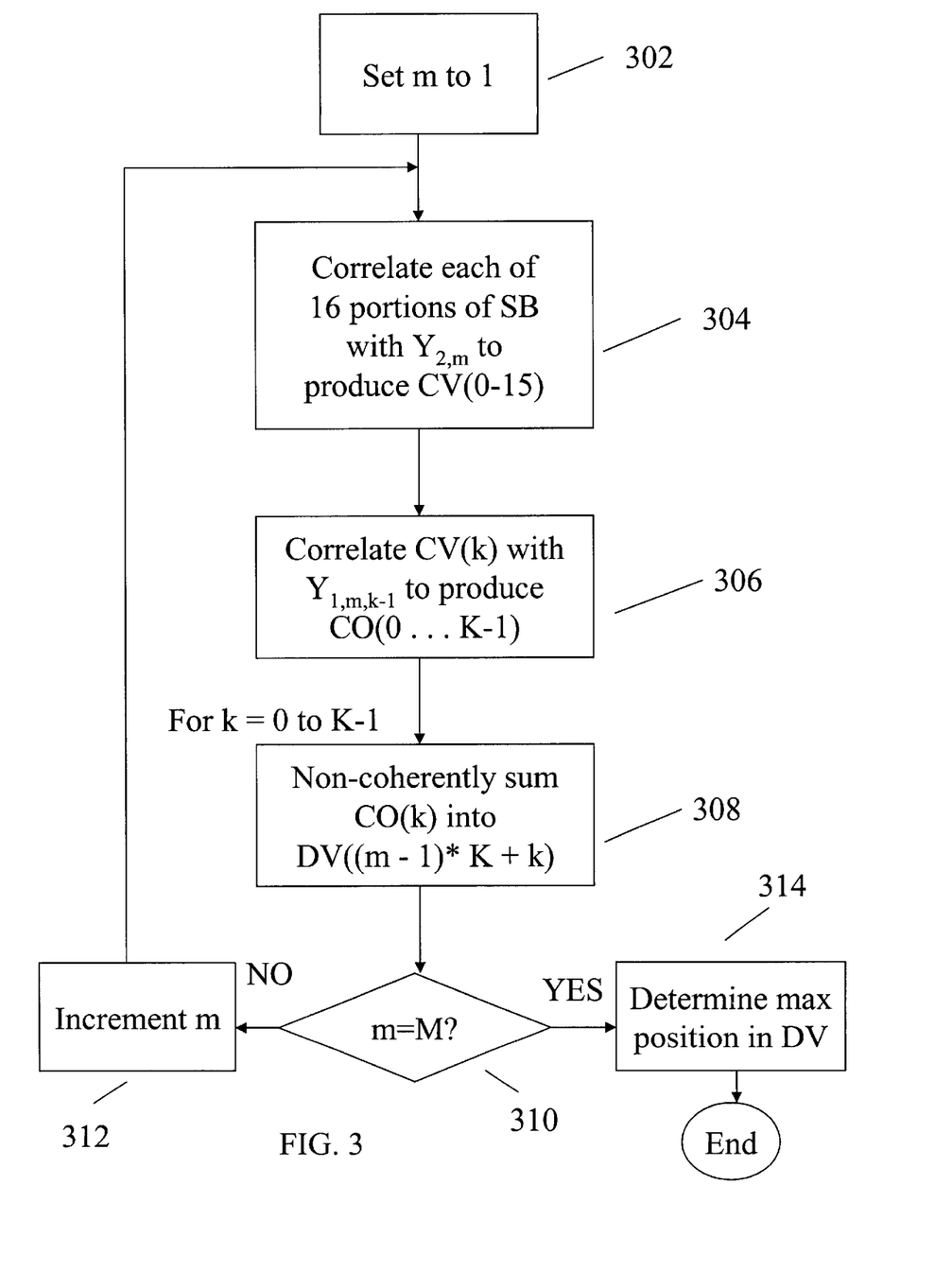
FIG. 3 is a flow chart of operations performed on the buffer of FIG. 2.

With slot synchronization determined, frame synchronization and code group identification is now described. 256 samples of the SSC beginning at a slot beginning and produced after waveform-matched filtering and sampling at the chip rate are stored in a secondary buffer SB, depicted in FIG. 2. The 256 samples are complex samples, representing the signal's I channel and Q channel respectively. The secondary buffer is logically construed as comprising 16 portions of 16 samples each. The processing then performed in a mobile station is depicted in FIG. 3.

In block 302, the value of a variable m is set to one.

In block 304, each of the 16 portions of SB (the portions being delineated in FIG. 2) are correlated against $Y_{2,m}$ to obtain 16 correlation values (CVs) denominated CV(0) through CV(15).

In block 306 each of the CVs are correlated against a different cyclic shift of the bits of $Y_{1,m}$ (each cyclic shift being connoted as $Y_{1,m,k}$) to produce K correlation outputs (COs) denominated CO(0) through CO(K−1).

In block 308, the K COs are summed into K positions of an array of decision variables (DVs), the determination of which K positions being made according to the current value of the variable m.

Decision block 310 and increment block 312 working in conjunction result in executing the computations for each value of m from 1 through M. Thus, all shifts of all values of $Y_1$ and $Y_2$, corresponding to all base stations, are used. As a result, DV(1) through DV(MK) are calculated.

The position of DV having the maximum value (block 314) identifies the code group/slot location pair that corresponds to the m value for the selected base station and the k-value for the slot which occurs at the start of the frame of K slots.

At this point the mobile station searches S downlink (long) scrambling codes within the code group and determines the exact scrambling code used by the chosen base station. The scrambling code is identified through symbol-by-symbol correlation over either the Pilot Channel or the fixed Primary CCPCH (common control physical channel) with all scrambling codes within the code group identified in the processing expostulated in FIG. 2.

It will thus be seen that the invention efficiently attains the advantages set forth above, among those made apparent from the preceding description. Those skilled in the art will appreciate that the configurations depicted in FIGS. 1, 2, and 3 and their supporting discussion in the specification provide a synchronization channel meeting these advantages.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. In a communication system, a method for determining a synchronization code, comprising:
   selecting a number of a first predetermined length from a set of numbers;
   selecting a second number of a second predetermined length from said set of numbers;
   determining a bit in said synchronization code by
   selecting a digit from said number,
   selecting a digit from said second number,
   adding the digits together using modulo addition and,
   cyclically shifting digits of the second number after determining a plurality of bits in said synchronization code having a total length equal to said first length.

2. The method according to claim 1 further comprising transmitting the synchronization code from a base station, receiving the synchronization code in a mobile station, and synchronizing the mobile station with the base station by correlating in the mobile station samples of the synchronization code with combinations of each value of a number of a first predetermined length selected from said set of numbers and all cyclic shifts of another number of a second predetermined length to produce a plurality of decision variables, and identifying a maximum decision variable, wherein the corresponding number of first predetermined length in the mobile station equals the number of first predetermined length in the base station, and the number of cyclic shifts of the corresponding number of second predetermined length in the mobile station is indicative of number of cyclic shifts of a number of second predetermined length in the base station.

3. The method according to claim 2 wherein the numbers in said set of numbers are chosen to produce synchronization codes having low cross-correlation and auto-correlation properties.

4. The method according to claim 2 wherein said number and said second number are binary numbers.

5. The method according to claim 4 wherein said number and said second number are identical.

6. The method according to claim 5 wherein said set of numbers includes 0001 1101 1001 0100,
0100 1000 1100 0001,
0010 1110 1010 0111,
0111 1011 1111 0010,
0100 1010 0010 0010,
0001 111 1011 10111,
0111 0110 0001 1110,
0010 0010 0100 1011, -continued 0001 0010 1001 1011,
0100 0111 1100 1110,
0010 0001 1010 1000,
0111 0100 1111 1101,
0010 1110 0101 1000,
0111 1011 0000 1101,
1011 1110 0001 0101,
1110 1011 0100 0000,
0111 0110 1110 0001,
0010 0011 1011 0100,
0111 1001 0001 0001,
0010 1100 0100 0100, and
1110 0110 0101 0011,
1011 0011 0000 0110,
1101 0101 1001 1111,
1000 0000 1100 1010,
1000 1100 0111 1110,
1101 1001 0010 1011,
1000 0011 0111 0001,
1101 0110 0010 0100,
1011 0000 0100 0010,
1110 0101 0001 0111,
1000 1100 1000 0001,
1101 1001 1101 0100.

7. In a CDMA radio system a method for synchronizing a mobile station and a base station comprising:
   said base station transmitting a synchronization code $c_p(n)$ over a synchronization channel wherein said synchronization code $c_p(n)$ is defined by the equation $$c_p(n)=(X_2(n \bmod n_2)+X_1(n \div n_1)) \bmod 2$$

for $n=0, 1, \ldots, (n_1 \ast n_2)-1$ where: $n_1$ is the length of $X_1$
   $n_2$ is the length of $X_2$
   $X_1$ and $X_2$ are sequences,
   and said base station transmitting a second synchronization code $c_s^{m,k}(n)$ over a second synchronization channel wherein the second synchronization code $c_s^{m,k}(n)$ is defined by the equation:

$$c_s^{m,k}(n)=(Y_{2,m}(n \bmod n_2)+Y_{1,m,k}(n \div n_1)) \bmod 2$$

for $n=0, 1, \ldots, (n_1 \ast n_2)-1$ where: $n_1$ is the length of $Y_1$
   $n_2$ is the length of $Y_2$
   $Y_{1,m}$ and $Y_{2,m}$ are selected from a set of M numbers
   $Y_{1,m,k}$ are K cyclic shifts of $Y_{1,m}$ for $k=0$ to $K-1$.

8. The method according to claim 7 wherein said mobile station receives said second synchronization codes, stores samples thereof, and correlates said samples against combinations of each value $Y_2$ and each cyclic shift of each value of $Y_1$ to determine a plurality of decision variables, and identifying a maximum decision variable, wherein the corresponding number of first predetermined length in the mobile station equals the value of $Y_2$ in the base station, and the number of cyclic shifts of the corresponding number of second predetermined length in the mobile station is indicative of number of cyclic shifts of $Y_1$ since commencement of transmission in the base station.

9. The method according to claim 8 wherein the numbers in the set of M numbers are chosen to produce synchronization codes having low cross-correlation and auto-correlation properties.

10. The method according to claim 8 wherein the numbers in the set of M numbers are binary numbers.

11. The method according to claim 10 wherein $Y_{1,m}$ and $Y_{2,m}$ are identical.

12. The method according to claim 11 wherein the set of M numbers includes 0001 1101 1001 0100,
0100 1000 1100 0001,
0010 1110 1010 0111,
0100 1010 0010 0010,
0001 111 1011 10111,
0111 0110 0001 1110,

| | |
|---|---|
| 0111 1011 1111 0010, | 0010 0010 0100 1011, |
| 0001 0010 1001 1011, | 1110 0110 0101 0011, |
| 0100 0111 1100 1110, | 1011 0011 0000 0110, |
| 0010 0001 1010 1000, | 1101 0101 1001 1111, |
| 0111 0100 1111 1101, | 1000 0000 1100 1010, |
| 0010 1110 0101 1000, | 1000 1100 0111 1110, |
| 0111 1011 0000 1101, | 1101 1001 0010 1011, |
| 1011 1110 0001 0101, | 1000 0011 0111 0001, |
| 1110 1011 0100 0000, | 1101 0110 0010 0100, |
| 0111 0110 1110 0001, | 1011 0000 0100 0010, |
| 0010 0011 1011 0100, | 1110 0101 0001 0111, |
| 0111 1001 0001 0001, | 1000 1100 1000 0001, |
| 0010 1100 0100 0100, and | 1101 1001 1101 0100. |

13. In a communication system comprising one or more base stations and one or more mobile stations, wherein each base station transmits frames in a regular frame timing, each frame comprising two or more slots one of which starts simultaneously with starting of a frame; a method for a mobile station to identify a base station and to synchronize with frame timing of the identified base station, comprising:

selecting in each base station a unique first number from a first predetermined set of M numbers each of a first length N2;

selecting in each base station a second number associated with the first number from a second predetermined set of M numbers each of a second length N1 where N1 is greater than or equal to the number of slots in a frame;

transmitting from each base station a synchronization code of length N=N1×N2 digits determined in each slot by:

generating each digit position of the synchronization code by:

selecting a first digit from the first number according to a function of digit position in the synchronization code;

selecting a second digit from the second number according to a function of digit position in the synchronization code; and adding the first and second digits in modulo arithmetic, and cyclically shifting the second number after each slot, and correlating in a mobile station samples of synchronization code received from a base station starting simultaneously with a start of a slot with combinations of:

M values of the first number, and all cyclic shifts of each corresponding second number to produce M×N1 decision variables; and identifying a maximum decision variable, wherein a particular first number corresponding to the maximum decision variable identifies the first number selected at the base station, whereby the base station is identified; and wherein a particular cyclic shift corresponding to the maximum decision variable identifies the slot whose start corresponds to starting of a frame.

14. In a communication system comprising one or more base stations and one or more mobile stations, wherein each base station transmits frames in a regular frame timing, each frame comprising two or more slots one of which starts simultaneously with starting of a frame; a method of sending a synchronization code from a base station, comprising:

selecting in each base station a different first number from a first predetermined set of M numbers each of a first length N2;

selecting in each base station a second number associated with the first number from a second predetermined set of M numbers each of a second length N1 where N1 is greater than or equal to the number of slots in a frame;

transmitting from each base station a synchronization code of length N=N1×N2 digits determined in each slot by:

generating each digit position of the synchronization code by:

selecting a first digit from the first number according to a function of digit position in the synchronization code;

selecting a second digit from the second number according to a function of digit position in the synchronization code; and adding the first and second digits in modulo arithmetic, and cyclically shifting the second number after each slot.

15. In a communication system comprising one or more base stations and one or more mobile stations, wherein each base station transmits frames in a regular frame timing, each frame comprising two or more slots one of which starts simultaneously with starting of a frame; a method for a mobile station to identify a base station and to synchronize with frame timing of the identified base station, comprising:

correlating in a mobile station samples of synchronization code received from a base station starting simultaneously with a start of a slot with combinations of:

each value of a first number selected sequentially from a first predetermined set of M numbers each of a first length N2, and all cyclic shifts of a second number corresponding to the first number and of a length N1 equal to the number of slots in a frame, to produce M×N1 decision variables; and identifying a maximum decision variable, wherein a particular first number corresponding to the maximum decision variable identifies a first number selected at the base station, whereby the base station is identified; and wherein a particular cyclic shift corresponding to the maximum decision variable identifies the slot whose start corresponds to starting of a frame.

16. The method according to claim 14 wherein the numbers in the predetermined sets of numbers are chosen to produce synchronization codes having low cross-correlation and auto-correlation properties.

17. The method according to claim 14 wherein the numbers in the predetermined sets of numbers are binary numbers.

18. The method according to claim 17 wherein the first and second sets of numbers are identical.

19. The method according to claim 18 wherein the first and second sets of numbers include

| | |
|---|---|
| 0001 1101 1001 0100, | 0100 1010 0010 0010, |
| 0100 1000 1100 0001, | 0001 111 1011 10111, |
| 0010 1110 1010 0111, | 0111 0110 0001 1110, |
| 0111 1011 1111 0010, | 0010 0010 0100 1011, |
| 0001 0010 1001 1011, | 1110 0110 0101 0011, |
| 0100 0111 1100 1110, | 1011 0011 0000 0110, |
| 0010 0001 1010 1000, | 1101 0101 1001 1111, |

| | |
|---|---|
| 0111 0100 1111 1101, | 1000 0000 1100 1010, |
| 0010 1110 0101 1000, | 1000 1100 0111 1110, |
| 0111 1011 0000 1101, | 1101 1001 0010 1011, |
| 1011 1110 0001 0101, | 1000 0011 0111 0001, |
| 1110 1011 0100 0000, | 1101 0110 0010 0100, |
| 0111 0110 1110 0001, | 1011 0000 0100 0010, |
| 0010 0011 1011 0100, | 1110 0101 0001 0111, |
| 0111 1001 0001 0001, | 1000 1100 1000 0001, |
| 0010 1100 0100 0100, and | 1101 1001 1101 0100. |

20. The method according to claim 15 wherein:

N1 is equal to N2 and both are equal to 16; and the step of correlating in a mobile station samples of synchronization code received from a base station starting simultaneously with a start of a slot with combinations of each value of a first number selected sequentially from a first predetermined set of M numbers each of a first length N2, and all cyclic shifts of a second number corresponding to the first number and of a length N1 equal to the number of slots in a frame to produce M×N1 decision variables comprises:
  storing in a buffer N1*M samples of signal from a base station beginning at a slot beginning;
  for each of the M pairs of binary numbers:
    correlating each of N1 equal portions of said buffer with an Mth of the first binary numbers to produce N1 common variables;
    correlating each of the N1 common variables with a different successive cyclic shift of an Mth of the second binary numbers to produce N1 correlation variables;
    summing the N1 correlation values into positions ((M−1)*N1)+1 through ((M−1)*N1)+N1 of the M*N1 decision variables.

21. In a communication system comprising one or more base stations and one or more mobile stations, wherein each base station transmits frames in a regular frame timing, each frame comprising two or more slots one of which starts simultaneously with starting of a frame; a method for a mobile station to identify a base station and to synchronize with frame timing of the identified base station, comprising:
  selecting in each base station a different first binary number $Y_2$ from a first predetermined set of M numbers each of a first length N2;
  selecting in each base station a second binary number Y, associated with the first number from a second predetermined set of M numbers each of a second length N1 where N1 is greater than or equal to the number of slots in a frame;
  transmitting from each base station a synchronization code c of length N=N1×N2 digits determined in each slot by:

$$c(n)=(Y_2(n \bmod N2)+Y_1(n \operatorname{div} N1)) \bmod 2$$

where n connotes positions 0 through N−1; and
  cyclically shifting $Y_1$ after each slot, and
  correlating in a mobile station samples of synchronization code received from a base station starting simultaneously with a start of a slot with combinations of:
    each value of $Y_2$ selected from said first predetermined set, and
    all cyclic shifts of each corresponding $Y_1$, to produce M×N1 decision variables; and
  identifying a maximum decision variable,
  wherein a particular $Y_2$ position corresponding to the maximum decision variable identifies a value of $Y_2$ selected at the base station, whereby the base station is identified; and
  wherein a particular cyclic shift corresponding to the maximum decision variable identifies the slot whose start corresponds to starting of a frame.

22. In a communication system comprising one or more base stations and one or more mobile stations, wherein each base station transmits frames in a regular frame timing, each frame comprising two or more slots one of which starts simultaneously with starting of a frame; a method of sending a synchronization code from a base station, comprising:
  selecting in each base station a different first binary number $Y_2$ from a first predetermined set of M numbers each of a first length N2;
  selecting in each base station a second binary number $Y_1$ associated with the first number from a second predetermined set of M numbers each of a second length N1 where N1 is greater than or equal to the number of slots in a frame;
  transmitting from each base station a synchronization code c of length N=N1×N2 digits determined in each slot by:

$$c(n)=(Y_2(n \bmod N2)+Y_1(n \operatorname{div} N1)) \bmod 2$$

where n connotes positions 0 through N−1; and
  cyclically shifting $Y_1$ after each slot.

23. In a communication system comprising one or more base stations and one or more mobile stations, wherein each base station transmits frames in a regular frame timing, each frame comprising two or more slots one of which starts simultaneously with starting of a frame; a method for a mobile station to identify a base station and to synchronize with frame timing of the identified base station, comprising:
  correlating in a mobile station samples of synchronization code received from a base station starting simultaneously with a start of a slot with combinations of:
    each value of $Y_2$ selected from a first predetermined set of binary numbers each of length N2, and
    all cyclic shifts of each corresponding $Y_1$ selected from a second predetermined set of binary numbers each of length N1,
  to produce M×N1 decision variables; and
  identifying a maximum decision variable,
  wherein a particular $Y_2$ position corresponding to the maximum decision variable identifies a value of $Y_2$ selected at the base station, whereby the base station is identified; and
  wherein a particular cyclic shift corresponding to the maximum decision variable identifies the slot whose start corresponds to starting of a frame.

24. The method according to claim 22 wherein the predetermined sets of numbers are chosen to produce synchronization codes having low cross-correlation and auto-correlation properties.

25. The method according to claim 24 wherein the first and second sets of numbers are identical.

26. The method according to claim 25 wherein the first and second sets of numbers include

| | |
|---|---|
| 0001 1101 1001 0100, | 0100 1010 0010 0010, |
| 0100 1000 1100 0001, | 0001 111 1011 10111, |

-continued

| | |
|---|---|
| 0010 1110 1010 0111, | 0111 0110 0001 1110, |
| 0111 1011 1111 0010, | 0010 0010 0100 1011, |
| 0001 0010 1001 1011, | 1110 0110 0101 0011, |
| 0100 0111 1100 1110, | 1011 0011 0000 0110, |
| 0010 0001 1010 1000, | 1101 0101 1001 1111, |
| 0111 0100 1111 1101, | 1000 0000 1100 1010, |
| 0010 1110 0101 1000, | 1000 1100 0111 1110, |
| 0111 1011 0000 1101, | 1101 1001 0010 1011, |
| 1011 1110 0001 0101, | 1000 0011 0111 0001, |
| 1110 1011 0100 0000, | 1101 0110 0010 0100, |
| 0111 0110 1110 0001, | 1011 0000 0100 0010, |
| 0010 0011 1011 0100, | 1110 0101 0001 0111, |
| 0111 1001 0001 0001, | 1000 1100 1000 0001, |
| 0010 1100 0100 0100, and | 1101 1001 1101 0100. |

27. The method according to claim 23 wherein:
N1 is equal to N2 and both are equal to 16; and
the step of correlating in a mobile station samples of synchronization code received from a base station starting simultaneously with a start of a slot with combinations of each value of $Y_2$ selected from a first predetermined set of binary numbers each of length N2, and all cyclic shifts of each corresponding $Y_1$ selected from a second predetermined set of binary numbers each of length N1 to produce M×N1 decision variables comprises:
  storing in a buffer N1*M samples of signal from a base station beginning at a slot beginning;
  for each of the M pairs of binary numbers:
    correlating each of N1 equal portions of said buffer with an Mth of the first binary numbers to produce N1 common variables;
    correlating each of the N1 common variables with a different successive cyclic shift of an Mth of the second binary numbers to produce N1 correlation variables;
    summing the N1 correlation values into positions ((M−1)*N1)+1 through ((M−1)*N1)+N1 of the M*N1 decision variables.

28. A propagated signal divided into frames, each frame comprising two or more slots one of which starts simultaneously with starting of a frame and comprising a synchronization code determined by:
  selecting a first number from a first predetermined set of M numbers each of a first length N2;
  selecting a second number associated with the first number from a second predetermined set of M numbers each of a second length N1 where N1 is greater than or equal to the number of slots in a frame;
  determining a synchronization code of length N=N1×N2 digits in each slot by:
    generating each digit position of the synchronization code by:
      selecting a first digit from the first number according to a function of digit position in the synchronization code;
      selecting a second digit from the second number according to a function of digit position in the synchronization code; and
      adding the first and second digits in modulo arithmetic, and
    cyclically shifting the second number after each slot.

29. The propagated signal according to claim 28 wherein the numbers in the predetermined sets of numbers are chosen to produce synchronization codes having low cross-correlation and auto-correlation properties.

30. The propagated signal according to claim 28 wherein the numbers in the predetermined sets of numbers are binary numbers.

31. The propagated signal according to claim 30 wherein the first and second sets of numbers are identical.

32. The propagated signal according to claim 31 wherein the first and second sets of numbers include

| | |
|---|---|
| 0001 1101 1001 0100, | 0100 1010 0010 0010, |
| 0100 1000 1100 0001, | 0001 111 1011 10111, |
| 0010 1110 1010 0111, | 0111 0110 0001 1110, |
| 0111 1011 1111 0010, | 0010 0010 0100 1011, |
| 0001 0010 1001 1011, | 1110 0110 0101 0011, |
| 0100 0111 1100 1110, | 1011 0011 0000 0110, |
| 0010 0001 1010 1000, | 1101 0101 1001 1111, |
| 0111 0100 1111 1101, | 1000 0000 1100 1010, |
| 0010 1110 0101 1000, | 1000 1100 0111 1110, |
| 0111 1011 0000 1101, | 1101 1001 0010 1011, |
| 1011 1110 0001 0101, | 1000 0011 0111 0001, |
| 1110 1011 0100 0000, | 1101 0110 0010 0100, |
| 0111 0110 1110 0001, | 1011 0000 0100 0010, |
| 0010 0011 1011 0100, | 1110 0101 0001 0111, |
| 0111 1001 0001 0001, | 1000 1100 1000 0001, |
| 0010 1100 0100 0100, and | 1101 1001 1101 0100. |

33. A propagated signal divided into frames, each frame comprising two or more slots one of which starts simultaneously with starting of a frame and comprising a synchronization code determined by:
  selecting a first binary number $Y_2$ from a first predetermined set of M numbers each of a first length N2;
  selecting a second binary number $Y_1$ associated with the first number from a second predetermined set of M numbers each of a second length N1 where N1 is greater than or equal to the number of slots in a frame;
  determining a synchronization code c of length N=N1×N2 digits in each slot by:

$c(n) = (Y_2(n \bmod N2) + Y_1(n \text{ div } N1)) \bmod 2$ where n connotes positions 0 through N−1; and
  cyclically shifting $Y_1$ after each slot.

34. The propagated signal according to claim 33 wherein the numbers in the predetermined sets of numbers are chosen to produce synchronization codes having low cross-correlation and auto-correlation properties.

35. The propagated signal according to claim 33 wherein the first and second sets of numbers are identical.

36. The propagated signal according to claim 34 wherein the first and second sets of numbers include

| | |
|---|---|
| 0001 1101 1001 0100, | 0100 1010 0010 0010, |
| 0100 1000 1100 0001, | 0001 111 1011 10111, |
| 0010 1110 1010 0111, | 0111 0110 0001 1110, |
| 0111 1011 1111 0010, | 0010 0010 0100 1011, |
| 0001 0010 1001 1011, | 1110 0110 0101 0011, |
| 0100 0111 1100 1110, | 1011 0011 0000 0110, |
| 0010 0001 1010 1000, | 1101 0101 1001 1111, |
| 0111 0100 1111 1101, | 1000 0000 1100 1010, |
| 0010 1110 0101 1000, | 1000 1100 0111 1110, |
| 0111 1011 0000 1101, | 1101 1001 0010 1011, |
| 1011 1110 0001 0101, | 1000 0011 0111 0001, |
| 1110 1011 0100 0000, | 1101 0110 0010 0100, |
| 0111 0110 1110 0001, | 1011 0000 0100 0010, |
| 0010 0011 1011 0100, | 1110 0101 0001 0111, |
| 0111 1001 0001 0001, | 1000 1100 1000 0001, |
| 0010 1100 0100 0100, and | 1101 1001 1101 0100. |

* * * * *